US011765652B2

(12) United States Patent
Byrne

(10) Patent No.: US 11,765,652 B2
(45) Date of Patent: *Sep. 19, 2023

(54) SIMULATING CONTINUOUS MILLIMETER WAVE BAND ACCESS TO A TELECOMMUNICATIONS NETWORK

(71) Applicant: T-Mobile USA, Inc., Bellevue, WA (US)

(72) Inventor: Cameron Byrne, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/539,749

(22) Filed: Dec. 1, 2021

(65) Prior Publication Data

US 2022/0095216 A1    Mar. 24, 2022

Related U.S. Application Data

(63) Continuation of application No. 16/905,752, filed on Jun. 18, 2020, now Pat. No. 11,224,012.

(51) Int. Cl.
*H04M 15/00* (2006.01)
*H04W 48/18* (2009.01)
(Continued)

(52) U.S. Cl.
CPC ........... *H04W 48/18* (2013.01); *H04M 15/61* (2013.01); *H04W 72/12* (2013.01); *H04W 76/10* (2018.02)

(58) Field of Classification Search
CPC ....... H04W 8/205; H04W 4/60; H04W 12/35; H04W 8/183; H04W 12/06; H04W 88/18;
(Continued)

(56) References Cited

U.S. PATENT DOCUMENTS 8,248,962 B2    8/2012  Zhao et al.
8,594,103 B2   11/2013  Zheng
(Continued)

FOREIGN PATENT DOCUMENTS

CN    101605373 B    9/2011
CN    102473163 A    5/2012
(Continued)

OTHER PUBLICATIONS

International Searching Authority, International Search Report and Written Opinion, PCT Patent Application PCT/US2021/036682, dated Sep. 10, 2021, 10 pages.

*Primary Examiner* — Joseph E Dean, Jr.
(74) *Attorney, Agent, or Firm* — Perkins Coie LLP

(57) ABSTRACT

The disclosed technology includes at least one method performed by a system of a telecommunications network. The system can establish a communications link between the wireless device and a network access node (NAN) of the 5G network. While connected over a non-mmW band, the wireless device autonomously schedules data downloads to occur when the wireless device is on an mmW band. The system then receives a request from the wireless device to perform the data downloads, which can be enabled by a packet gateway (PGW) upon receiving a confirmation by the NAN that the wireless device can connect over the mmW band. Otherwise, the PGW denies the wireless device's request to perform the data downloads, which can be enforced by the NAN.

20 Claims, 4 Drawing Sheets

(51) Int. Cl.
*H04W 76/10* (2018.01)
*H04W 72/12* (2023.01)

(58) Field of Classification Search
CPC ..... H04W 12/40; H04W 88/02; H04W 48/18; H04W 72/12; H04W 76/10; H04W 4/24; H04W 88/06; H04L 67/02; H04L 63/0853; H04L 69/24; H04L 67/30; H04L 12/14; H04L 12/1407; H04L 65/1016; H04L 65/1023; H04L 65/1069; H04L 65/80; H04M 15/61; H04M 15/41; H04M 15/57; H04M 15/66; H04M 15/8016; H04M 15/8027; H04M 15/8044; H04M 15/8083

See application file for complete search history.

(56) References Cited

U.S. PATENT DOCUMENTS

| | | | |
|---|---|---|---|
| 9,572,079 | B2 | 2/2017 | Somayazulu et al. |
| 9,781,631 | B2 | 10/2017 | To |
| 9,794,771 | B2 | 10/2017 | Raveendran |
| 9,813,973 | B2 | 11/2017 | Ben Bassat et al. |
| 9,843,687 | B2 | 12/2017 | Campbell et al. |
| 9,935,694 | B2 | 4/2018 | Shan |
| 9,986,496 | B2 | 5/2018 | Nylander et al. |
| 10,477,385 | B2 | 11/2019 | Rajagopalan et al. |
| 10,681,725 | B2 | 6/2020 | Chakraborty et al. |
| 11,224,012 | B1 * | 1/2022 | Byrne ............... H04M 15/8044 |
| 2006/0126584 | A1 | 6/2006 | Zhang et al. |
| 2009/0037999 | A1 | 2/2009 | Anderson et al. |
| 2012/0147872 | A1 | 6/2012 | Zisimopoulos et al. |
| 2013/0010756 | A1 | 1/2013 | Liang et al. |
| 2013/0301611 | A1 | 11/2013 | Baghel et al. |
| 2017/0055298 | A1 | 2/2017 | Pawar et al. |

FOREIGN PATENT DOCUMENTS

| | | |
|---|---|---|
| CN | 102598604 A | 7/2012 |
| CN | 107113652 A | 8/2017 |
| CN | 103999377 B | 2/2018 |
| CN | 110636523 A | 12/2019 |
| DE | 102015209070 A1 | 11/2016 |
| DE | 112016003717 T5 | 5/2018 |
| EP | 1693988 A1 | 8/2006 |
| EP | 2218283 A1 | 8/2010 |
| EP | 2255555 A1 | 12/2010 |
| EP | 2628337 A1 | 8/2013 |
| EP | 2847947 A1 | 3/2015 |
| EP | 2858418 A1 | 4/2015 |
| EP | 3005784 A1 | 4/2016 |
| EP | 2249538 B1 | 11/2016 |
| EP | 3138307 B1 | 9/2019 |
| JP | 2011517534 A | 6/2011 |
| JP | 2011517862 A | 6/2011 |
| JP | 6063564 B2 | 12/2016 |
| JP | 6470392 B2 | 1/2019 |
| JP | 6510062 B2 | 4/2019 |
| KR | 100520047 B1 | 10/2005 |
| KR | 20140073862 A | 6/2014 |
| KR | 101416301 B1 | 8/2014 |
| KR | 20160147927 A | 12/2016 |
| KR | 101844837 B1 | 4/2018 |
| KR | 101861033 B1 | 5/2018 |
| WO | 2009113468 A1 | 9/2009 |
| WO | 2011019159 A2 | 2/2011 |
| WO | 2012050493 A1 | 4/2012 |
| WO | 2013169073 A1 | 11/2013 |
| WO | 2014193723 A1 | 12/2014 |
| WO | 2015168394 A1 | 11/2015 |
| WO | 2017030740 A1 | 2/2017 |
| WO | 2018118050 A1 | 6/2018 |
| WO | 2019023033 A1 | 1/2019 |

* cited by examiner

SIMULATING CONTINUOUS MILLIMETER WAVE BAND ACCESS TO A TELECOMMUNICATIONS NETWORK

CROSS-REFERENCE TO RELATED APPLICATION

This application is a continuation of U.S. patent application Ser. No. 16/905,752, filed on Jun. 18, 2020, entitled SIMULATING CONTINUOUS MILLIMETER WAVE BAND ACCESS TO A TELECOMMUNICATIONS NETWORK, the disclosure of which is hereby incorporated herein in its entirety by reference for all purposes.

BACKGROUND 5G refers to fifth generation wireless communication technologies that support cellular data networks. 3GPP defines any system using 5G New Radio (5G NR) software as 5G. The frequency spectrum of 5G is divided into millimeter wave, mid-band, and low-band. Low-band uses a similar frequency range as LTE/LTE-A, the predecessor to 5G, which is also referred to as 4G communication. Millimeter wave is the fastest, with actual speeds often being 1-2 Gbit/s, at frequencies above 24 GHz, reaching up to 72 GHz in some examples. The signal reach of many 5G network access nodes is short and, as such, more cells are required compared to 4G. Further, indoor coverage is limited because millimeter waves have difficulty traversing walls and windows. 5G mid-band offers a compromise between speed and signal reach.

5G networks support numerous and different types of communications that provide ultrahigh-speed service delivery and connect a massive number of devices. For example, 5G networks support massively interconnected devices for Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), and other communications. Each of these communication types may have different transmission and latency requirements. Moreover, 5G networks can require efficient allocation of resources while minimizing conflicts and interference.

BRIEF DESCRIPTION OF THE DRAWINGS

Embodiments of the present technology will be described and explained through the use of the accompanying drawings.

Figure 1:
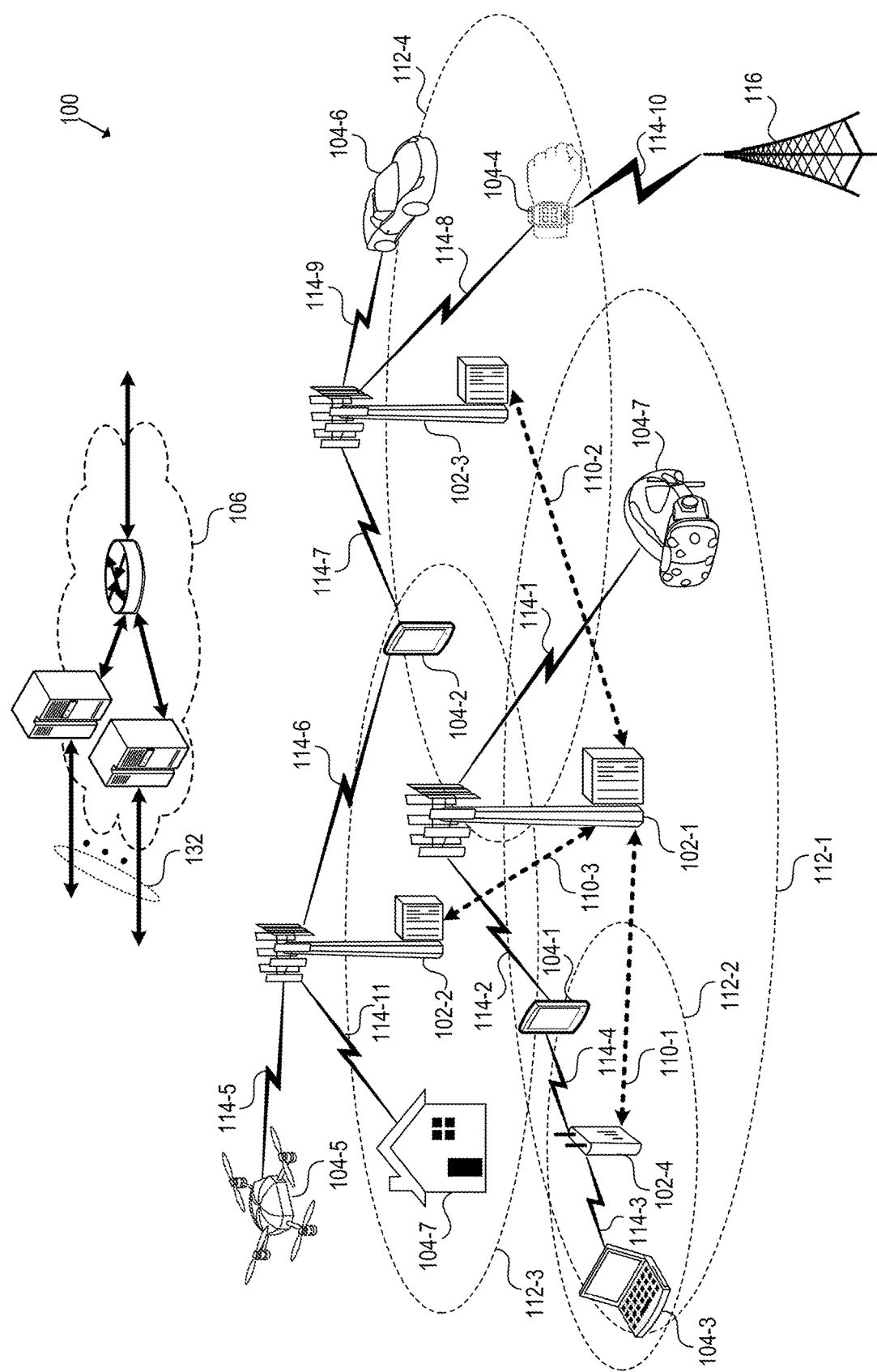
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

A wireless device (e.g., mobile device) experiences drastically changing radio frequency (RF) conditions, especially in 5G as the mobile wireless device traverses license assisted access (LAA), millimeter wave (mmW), mid-range, and/or low-range bands. A major feature of 5G networks is operationalizing mmW capacity. However, mmWs propagate solely by line-of-sight (LOS) paths and, as a result, access to mmW capacity by a wireless device requires LOS to a network access node (NAN), such as a tower, which is not available everywhere (e.g., inside a user's home). Thus, users rely heavily on a home broadband network (Wi-Fi) and manually configure a wireless device to download or stream certain forms of data only while connected to Wi-Fi. Doing so restricts data consumption on a cellular network, which is a costly component of a service plan and can congest the network. Thus, wireless devices are unable to access the high-speed, low-latency, high-capacity mmW capacity of 5G networks from anywhere.

The disclosed technology includes a technique for a wireless device to work with network nodes to provide a user with perceived consistent mmW access to a telecommunications network. The wireless device can connect with a NAN over either an mmW link or a non-mmW link (e.g., mid-band, low-band) to access the 5G network. If the wireless device is within LOS of the NAN and the network conditions are suitable for an mmW link, the wireless device can experience high-speed, low-latency, high capacity access to the 5G network. While connected over the mmW link, the wireless device can preload a local memory with data that a user is likely to access later. As such, the user can access the preloaded data to experience perceived access to the 5G network over an mmW link despite the absence of an mmW link.

For example, the wireless device can include an application programming interface (API) that connects with local applications ("apps"), which request the operating system to queue certain data items for download when connected to an mmW band of the 5G network. The wireless device can autonomously predict suitable data items based on the user's activities in accordance with machine learning techniques. As such, a queue of data items is filled and scheduled for download when the wireless device connects to an mmW band of the 5G network. For example, a streaming video app can predict programs based on the user's viewing history and request that the wireless device download the programs proactively when connected to the 5G network over an mmW link. As such, when the wireless device is connected on a non-mmW link to the 5G network or disconnected entirely, the data items that are stored locally are accessible as if the wireless device is connected in real-time over an mmW link. That is, a user can experience consistent rendering of high-resolution video while not connected over an mmW link because the wireless device plays back the video that is stored locally at the wireless device. Accordingly, the wireless device can move non-real-time consumption to mmW bands to download data in the background.

As the wireless device changes from mmW bands to non-mmW bands, the NAN that provides access to the 5G network enforces policies of a packet gateway (PGW) to promote maximum mmW band utilization. For example, the NAN can report requests from the wireless device along with network conditions to the PGW, which returns instructions for the NAN. As such, the NAN functions as a trusted source of network and connection status information for the PGW rather than passively enabling any requests from the wireless device. That is, the NAN is trusted because it is a known, identifiable, and recognized network-side device rather than a rouge wireless device.

A network carrier can also incentivize subscribers to utilize mmW bands by offering free mmW access while charging for non-mmW utilization. As such, the PGW couples to the billing function of the network to record utilization of mmW bands and non-mmW bands. In another example, the network can intentionally limit performance by wireless devices on non-mmW links to induce users into seeking mmW connections. For example, a streaming video can play with a 4K-definition only over an mmW link and in standard definition over non-mmW links.

Thus, the disclosed technology can maximize or encourage data consumption on 5G mmW bands, which can ultimately displace home broadband networks. Doing so improves user experience and is operationally less costly for network carriers compared to legacy systems (e.g., 4G), as well as provide other benefits.

Wireless Communications System

FIG. 1 is a block diagram that illustrates a wireless communication system 100 ("system 100"). The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like.

The NANs of a network formed by the system 100 also includes wireless devices 104-1 through 104-8 (referred to individually as "wireless device 104" or collectively as "wireless devices 104") and a core network 106. The wireless devices 104-1 through 104-7 are capable of communication using various connectivity standards. For example, a 5G communication channel can use mmW access frequencies of 28 GHz. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1), which can be wired or wireless communication links.

The base stations 102 can wirelessly communicate with the wireless devices 104 via one or more base station antennas. The cell sites can provide communication coverage for geographic coverage area 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations 102 of different types (e.g., macro and/or small cell base stations). In some embodiments, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cell. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. A small cell is a lower-powered base station, as compared with a macro cell, and can operate in the same or different (e.g., licensed, unlicensed) frequency bands as macro cells. Examples of small cells include pico cells, femto cells, and micro cells. A pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that provide access to the network are NANs.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as a part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Wireless Network Components

Figure 2:
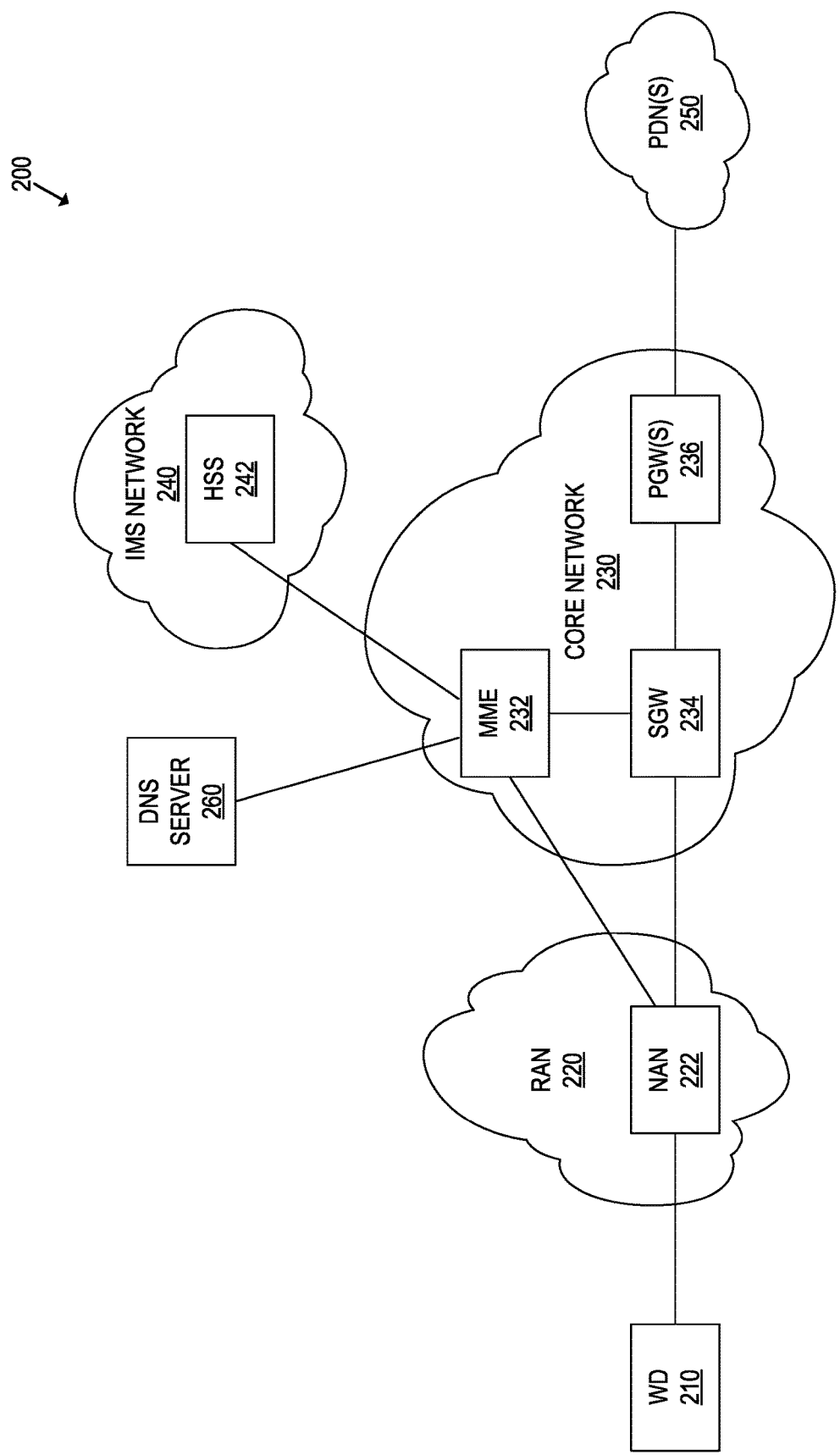
FIG. 2 is a block diagram that illustrates core components of a wireless network.

FIG. 2 is a block diagram that illustrates core components of a wireless network. As shown, the network 200 (e.g., of system 100) can include a wireless device 210 (e.g., wireless device 114), a radio access network (RAN) 220, a core network 230, an IP multimedia subsystem (IMS) network 240, one or more public data networks (PDNs) 250, and a domain name server (DNS) 260. The RAN 220 includes a network access node (NAN) 222. The core network 230 includes a mobility management entity (MME) 232, a serving gateway (SGW) 234, and multiple PGWs 236. The IMS network 240 includes a home subscriber server (HSS) 242. The components of the network 200 can interconnect via wired and/or wireless connections through interfaces that are not described herein for the sake of brevity. Implementations can include any number of UEs, RANs (e.g., 4G, 5G), NANs (e.g., eNB, gNB), etc.

The RAN 220 connects subscribers (e.g., wireless device 210) to a service provider. The RAN 220 is capable of supporting high data rates, low-latency, packet optimization, large capacity and coverage, etc. The NAN 222 can receive voice and/or data from MME 232 and/or SGW 234 and wirelessly transmit that voice and/or data to the wireless device 210. The NAN 222 wireless device also include one or more devices that wirelessly receive voice and/or data from the wireless device 210 and transmit that voice and/or data to one of the MME 232 and/or the SGW 234 or to other UEs. The NAN 222 can combine the functions of a base station and a radio network controller (RNC) in some RANs.

The core network 230 can be or include a 5G core and/or a 4G EPC core network architecture. In one example, the core network 230 wireless device include an all-IP packet-switched core network that supports high-speed wireless and wireline broadband access technologies. In another example, the core network 230 can provide packet-switched voice services using the IMS network 240.

The MME 232 can perform idle mode tracking and paging procedures (e.g., including retransmissions) for the wireless device 210. The MME 232 can be involved in a bearer activation/deactivation process and can choose an SGW for wireless device 210 at an initial attach and at a time of a handover. The MME 232 can authenticate the wireless device 210 (e.g., with the HSS 242), allocate temporary identities to UEs, enforce roaming restrictions for UEs, provide a control plane function for mobility between networks, etc.

The SGW 234 can include data transfer devices (or network devices), such as a gateway, a router, a switch, a firewall, a network interface card (NIC), a hub, a bridge, a proxy server, or some other type of device that processes and/or transfers data. In one example implementation, the SGW 234 can route and forward user data packets, can act as a mobility anchor for a user plane during handovers, and can act as an anchor for mobility between network technologies.

Each of the PGWs 236 can include one or more devices that process and/or transfer data. In one example implementation, a PGW provides connectivity of the wireless device 210 to external PDNs as a traffic exit/entry point for the wireless device 210. The wireless device 210 wireless device simultaneously connect to more than one PGW 236 for accessing multiple PDNs 250. The PGWs 236 can perform policy deployment or enforcement, packet filtering for each wireless device, charging support, lawful intercept, and packet screening. The PGWs 236 can act as anchors for mobility between different network technologies (e.g., 4G, 5G). Thus, the PGW has subscriber awareness features, stores policies that enable access to mmW services, and generates billing records.

The IMS network 240 can include an architectural framework or network for delivering IP multimedia services. The HSS 242 can include a master user database that supports devices of the IMS network 240 that handle calls. The HSS 242 can include subscriber identifiers, perform authentication and authorization of a user, and provide information about a subscriber's location and IP information. Each of the PDNs 250 can include one or more networks capable of communicating with wireless devices. As traffic conditions change in the PDNs 250, packets are dynamically routed via different paths in the PDNs 250.

The DNS 260 can include a distributed hierarchical naming system for devices, services, or any resources connected to the Internet or other networks. The DNS can associate a variety of information with domain names assigned to each of the devices, services, resources, etc. The DNS can translate domain names into numerical (e.g., binary) identifiers associated with network devices for the purpose of locating and addressing these network devices. The DNS 260 can execute special-purpose networking software, may include a public IP address, and may provide a database of network names and IP addresses for network devices such as the PGWs 236.

Other implementations can include fewer, additional, or different devices or networks, or differently arranged devices or networks than depicted in FIG. 2. Alternatively, or additionally, one or more devices or networks of the network 200 may perform one or more other tasks described as being performed by one or more other devices or networks of network 200.

Simulated Continuous mmW Access

The simulated continuous mmW access is enabled in part by the high-capacity local memory of wireless devices. When a wireless device is on a non-mmW band or disconnected from the network entirely, the wireless device autonomously queues data items (e.g., content, software) for download that is scheduled to occur when the wireless device is on an mmW band. Then, when the user selects the data items from the wireless device, the user can experience high-speed, low-latency, high capacity access regardless of whether the wireless device is connected to the 5G network over an mmW or non-mmW link.

The disclosed technology uses a trusted network source to confirm that a wireless device is on an mmW link, which can prevent the wireless device from performing scheduled downloads while on non-mmW links. This addresses an additional problem of a hacked wireless device that tricks the network into allowing downloads while on a non-mmW link. In one example, a NAN is a trusted source that confirms to an upstream PGW that the wireless device can access an mmW link for downloads. As indicated earlier, the PGW has subscriber awareness features, stores policies that enable access to mmW services, and generates billing records.

The NAN can detect and report an RF condition upstream to the PGW or another node that deploys or enforces policies for data downloads. For example, the NAN can report current conditions for MIMO, carrier aggregation (CA), and so on, which can be used by the PGW to manage the NAN and services to the wireless device. If the NAN detects that the wireless device only has access to a low capacity data link, the NAN can report that condition and request that the PGW limit the subscriber's demand for high-capacity downloads. The wireless device can also throttle back demand for optional capacity usage, such as requesting HD video, software updates, podcast updates, and app updates. On the other hand, if the NAN detects that the wireless device can access an mmW link, CA, or MIMO, the PGW can allow non-real-time downloads of podcasts, apps, and software updates.

The network carrier can also actively incentivize mmW utilization by, for example, offering free use of an mmW communications and charging for non-mmW communications, which can be tracked by the PGW based on the conditions reported by the NAN. In another example, the network can impair a subscriber's experience on a non-mmW link to induce mmW utilization.

Figure 3:
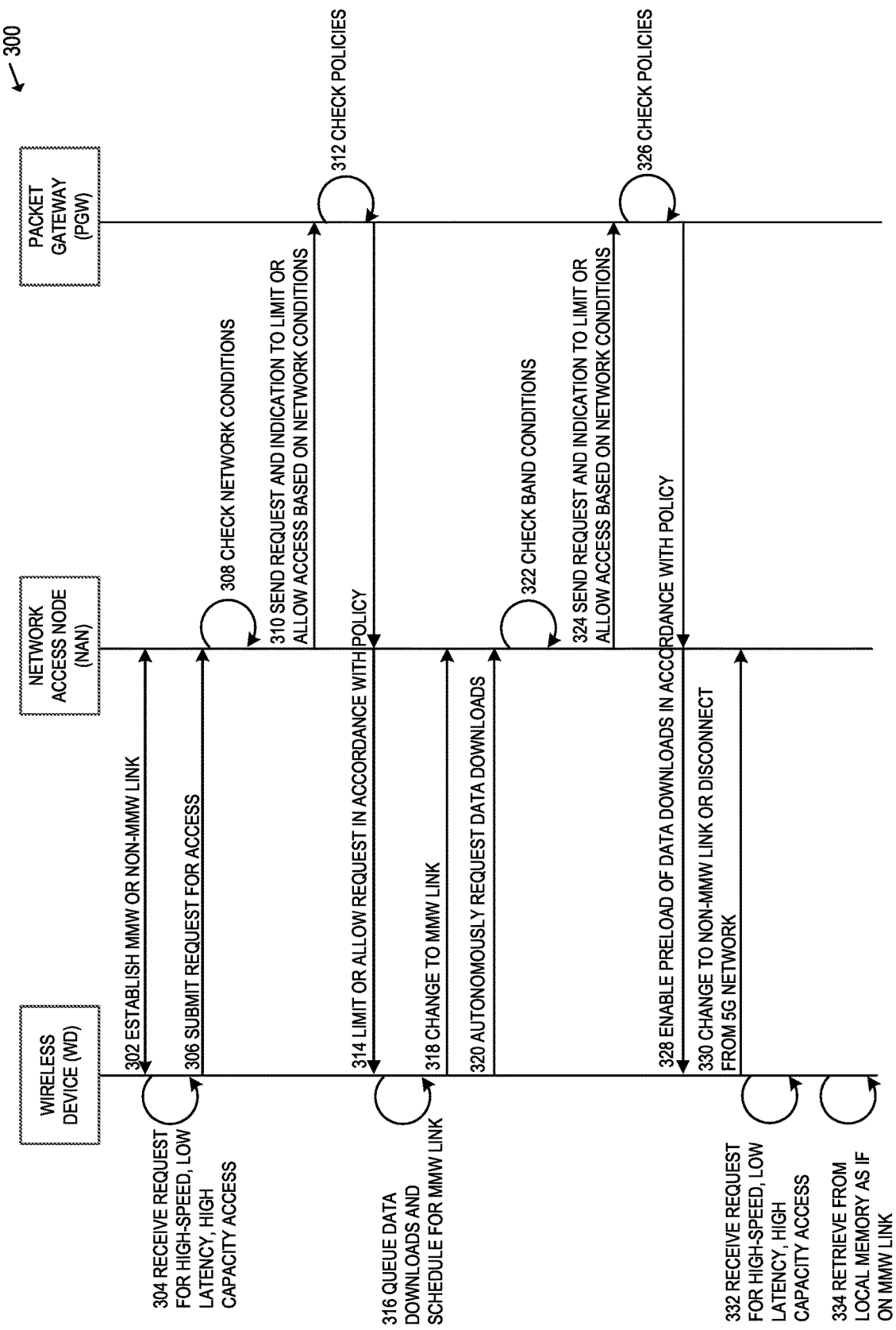
FIG. 3 is a flow diagram that illustrates a process for simulating continuous access to a millimeter wave (mmW) band by using trusted capacity reporting for conditional usage and scheduling.

FIG. 3 is a flow diagram that illustrates a process for simulating continuous access to an mmW band based on trusted capacity reporting for conditional usage and scheduling. At 302, a communications link is established between the wireless device and the telecommunications network (e.g., 5G network) over an mmW band or a non-mmW band (e.g., low band, mid band). The communications link includes a leg between the wireless device and a network access node (NAN) of the 5G network. The NAN is configured to provide access for the wireless device to the 5G network over the mmW band and the non-mmW band. Access to the 5G network over the mmW band requires line-of-sight (LOS) to the NAN. Access to the 5G network over a non-mmW band does not require LOS but offers inferior performance compared to the mmW band.

At 304, the wireless device receives a request for high-speed, low-latency, high capacity access to the 5G network. For example, the user can open a video streaming app on the wireless device and select a program for streaming a high-resolution video over the 5G network. Other examples of forms of data that would benefit from high-speed, low-latency, high capacity access include large software programs or patches that can be requested by the wireless device without user input.

At 306, the wireless device submits the request to the NAN. Usage of network resources is conditioned on the bands that the wireless device can use to access the network. For example, if the wireless device has access to a high-speed, low-latency, high-capacity RF band such as an mmW band, then the network could enable real-time or near-real time access to data over the network. On the other hand, if the wireless device only has access to a non-mmW band such as a low band or mid band, then the network could limit access to the data or, for example, provide lower quality data to incentivize the user of the wireless device to seek out access to an mmW band.

At 308, the NAN checks one or more conditions of the network. The NAN can check the speed, latency, and/or capacity of the network resources available to the wireless device. Examples include an impaired (e.g., attenuated) or unimpaired mmW band, mid-band, or low band resource.

At 310, the NAN sends at least an indication of the wireless device's request and the detected network conditions. In one example, the network condition indicates that the wireless device has access to the mmW band. In another example, the indication includes a request generated by the NAN to limit or allow the access by the PGW. That is, the NAN can determine a suitable response to the wireless device's request. In another example, the indication can include information about the network conditions for the PGW to determine a suitable response to the wireless device's request.

At 312, the information obtained by the NAN is received and processed at the PGW in accordance with policies to formulate instructions for controlling access by the wireless device and for billing purposes. In particular, the PGW includes a memory that stores one or more policies to control data access by the wireless device and record an indication of access to the 5D network by the wireless device for billing purposes, in accordance with a service plan related to the wireless device. For example, to incentivize maximum mmW band usage, a service plan may provide free mmW usage and meter the usage of non-mmW bands. At 314, the instructions that limit or allow the request are communicated to the NAN, which can enforce the instructions on the wireless device.

At 316, while the wireless device is accessing the 5G network over the non-mmW band, the wireless device can be caused to autonomously schedule data downloads. For example, a data item is autonomously added to a queue including multiple data items that are scheduled for download to the wireless device when the wireless device connects to the 5G network over an mmW link. In other words, the wireless device can schedule data while on the non-mmW link and then preload the scheduled data when the wireless device changes to an mmW link at 318.

In one implementation, an application programming interface (API) at the wireless device obtains feedback from a media streaming application on the wireless device and identify the media item for the queue of the multiple data items. For example, the system can implement one or more machine learning algorithms to predict a type or category of program that a user is likely to select for rendering. The machine learning algorithms can predict the program based on the historical activity of the user on the media app. For example, the system can select a child's cartoon program in a series if the user routinely or recently viewed a related cartoon program on the wireless device or another user device. As another example, the system can identify a currently stored episode of a video or podcast media item in a series, and predict that the mobile device will soon request the next media item in the series.

At 320, the wireless device autonomously sends a request to the NAN to perform the scheduled data downloads. At 322, the NAN checks condition(s) of the network. For example, similar to 308, the NAN can check the speed, latency, and/or capacity of the network available to the wireless device.

At 324, the NAN sends the request and an indication of the network conditions to the PGW regarding whether to limit or allow the access to the wireless device based on the conditions detected by the NAN, in a manner similar to 310. In 326, the information sent by the NAN is processed in accordance with the PGWs policies to formulate instructions for controlling whether the wireless device can preload the scheduled data and for billing purposes, in a manner similar to 312. In one example, a condition affects a communication link of the wireless device to the network. The condition relates to a network capacity or network congestion and is detected by the NAN. The system can cause the wireless device to throttle download of the multiple data items if the network capacity is impaired or the congestion impairs data transfers on the mmW band.

At 328, the instructions from the PGW enable the wireless device to download the scheduled data (e.g., multiple data items). The wireless device can thus preload the multiple data items over the mmW band and store the multiple data items at a local memory of the wireless device. The data items that stored at the local memory are available for the wireless device to simulate access over the mmW band while the wireless device is connected to the 5G network over a non-mmW band.

At 330, the wireless device changes to connect to the 5G network over a non-mmW link or disconnects from the 5G network entirely. As such, the wireless device no longer has high-speed, low-latency, high capacity access to the 5G network. At 332, the wireless device receives a request for high-speed, low-latency, high capacity access to the 5G network, in a manner similar to 304. For example, the user can select a program for streaming over the 5G network.

At 334, the wireless device retrieves the data from the local memory in lieu of obtaining the data over the 5G network. For example, the wireless device can render stored data (e.g., video) as if the wireless device is connected to the 5G network over an mmW band and streaming the video in real-time. As such, the user perceives high-speed, low-latency, high capacity access to the 5G network while the wireless device is connected to the network over a non-mmW band or disconnected from the network entirely.

Thus, the disclosed technology can maximize consumption on 5G mmW bands, which can displace wireless local area networks, and is operationally less costly and provides superior performance compared to legacy systems (e.g., 4G). The technology can simulate continuous access by a UE to an mmW band (or another extremely high frequency (EHF) band) of a 5G network, which is enabled in part by the high-capacity local memory of UEs. When a UE is on a non-mmW band, the UE autonomously queues data (e.g., files, content, software patches) for download when the UE is on the mmW band. The stored data files are accessible for rendering later as if the UE is on an mmW band of the 5G network. A network carrier can also actively incentivize use of mmW service by, for example, offering free use of an mmW service or by impairing subscriber experience on legacy networks to induce use of the mmW service. The technology also uses a trusted network source to confirm that the UE can access the mmW service, which addresses the problem of a hacked UE that tricks the network into allowing data while on a non-mmW band.

Computer System

Figure 4:
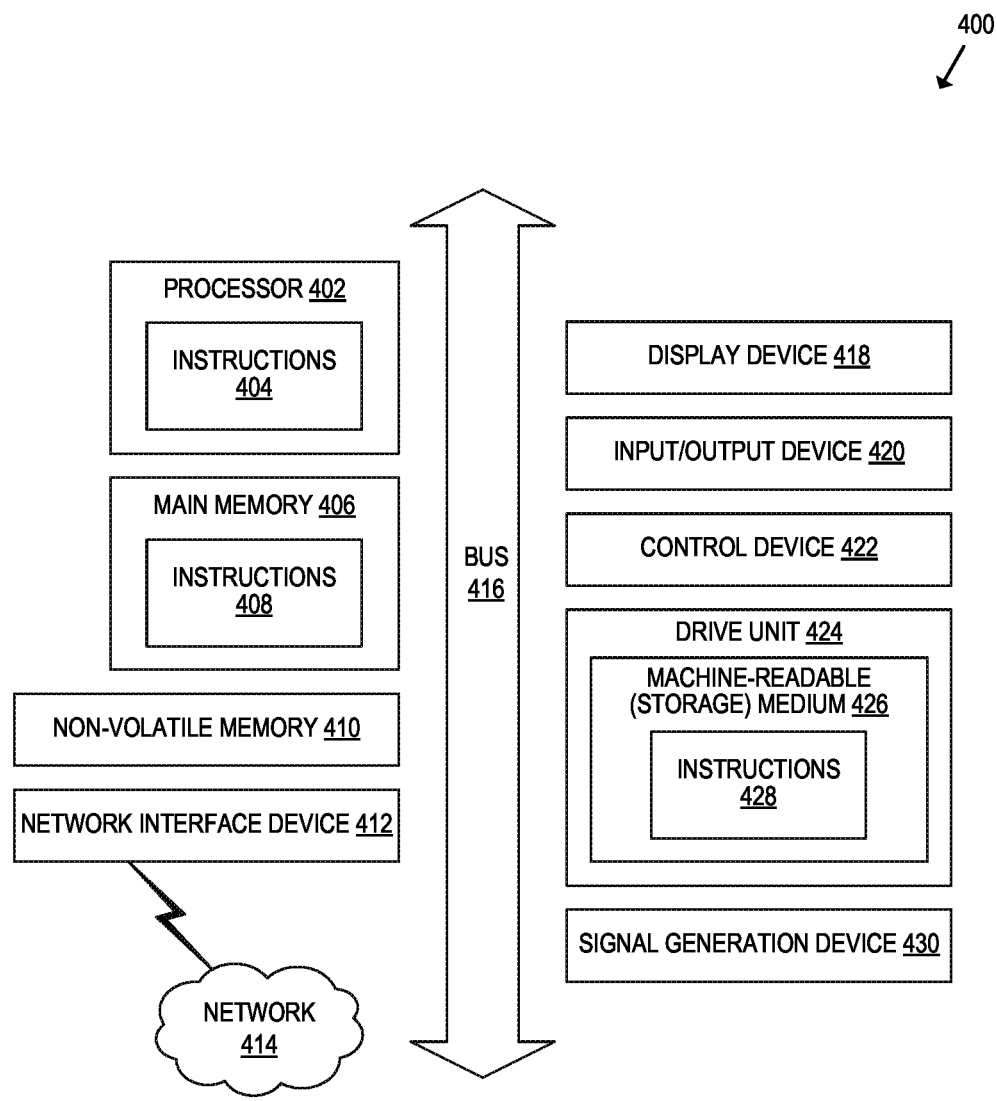
FIG. 4 is a block diagram that illustrates an example of a computing system in which at least some operations described herein can be implemented.

FIG. 4 is a block diagram that illustrates an example of a computer system 400 in which at least some operations described herein can be implemented. For example, components of system 100 or network 200 can include or host components of the computing system 400.

As shown, the computer system 400 can include one or more processors 402, main memory 406, non-volatile memory 410, a network interface device 412, video display device 418, an input/output device 420, a control device 422 (e.g., keyboard and point device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. The bus 416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 4 for brevity. Instead, the computer system 400 is intended to illustrate a hardware device on which components illustrated in the examples of FIGS. 1-3 and any other components described in this specification can be implemented.

The computer system 400 can take any suitable physical form. For example, the computing system 400 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some embodiment, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The processor 402 can be, for example, a central processing unit, a conventional microprocessor (e.g., Intel Pentium processor). The memory (e.g., main memory 406, non-volatile memory 410, machine-readable medium 426) can be local, remote, or distributed. Although shown as single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. One of skill in the relevant art will recognize that the machine-readable medium 426 can include any type of medium that is accessible by the processor. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

Software is typically stored in the non-volatile memory and/or the drive unit 424. When software is moved to the memory for execution, the processor 402 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 412 enables the computing system 400 to mediate data in a network 414 with an entity that is external to the computing system 400 through any communication protocol supported by the computing system 400 and the external entity. Examiner of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 412 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 420 include a keyboard, a mouse or other pointing device, disk drives, printers, a scanner, and other input and/or output devices, including a display device. Examples of the display device 418 can include a cathode ray tube (CRT), liquid crystal display (LCD), or any display device.

In operation, the computer system 400 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. At least one non-transitory, computer-readable medium, storing instructions, which when executed by at least one data processor, perform operations for access by a wireless device wireless device to a millimeter wave (mmW) band of a 5G network, the operations comprising:
  establish a communications link between the wireless device and the 5G network over a non-mmW band,
    wherein the communications link includes a leg between the wireless device and a network access node (NAN) of the 5G network,
    wherein the NAN is configured to provide access for the wireless device to the 5G network over the mmW band and the non-mmW band, and
    wherein access to the 5G network over the mmW band substantially requires line-of-sight (LOS) to the NAN; and
  enable the wireless device to access for downloading at least one data item upon determining that the wireless device has access to the mmW band of the 5G network; and,
  wherein the wireless device is provided with the at least one data item to download over the mmW band of the 5G network.

2. The computer-readable medium of claim 1, wherein a packet gateway includes a memory that stores one or more policies to control data access by the wireless device and record an indication of access to the 5G network by the wireless device for billing in accordance with a service plan related to the wireless device, and wherein a policy of the one or more policies incentivizes mmW utilization by granting subscribers free mmW utilization and charging for non-mmW utilization.

3. The computer-readable medium of claim 1, wherein the NAN is a next generation gigabit NodeB (gNB) configured to detect whether the wireless device is within LOS to download the at least one data item over the mmW band of the 5G network.

4. The computer-readable medium of claim 1, wherein the at least one data item is a media item, and the operations further comprises:
  cause an application programming interface (API) to obtain feedback from a media streaming application on the wireless device and identify the media item for a queue of the data items,
  wherein the at least one data item is a next media item episode in a series that sequentially follows a stored episode for the series currently stored on the wireless device.

5. The computer-readable medium of claim 1, further comprising while the wireless device is accessing the 5G network over the band other than the mmW band, cause, the wireless device to autonomously schedule a download of a data item,
  wherein the data item is autonomously added to a queue of data items that are scheduled for downloading to the wireless device.

6. The computer-readable medium of claim 1, wherein the at least one data item includes a particular data item that was added autonomously to a queue while the wireless device was disconnected from the 5G network.

7. The computer-readable medium of claim 1, wherein enabling the wireless device access for downloading the at least one data item comprises:
  receiving, at a packet gateway, a message generated by the NAN to confirm that the wireless device has access to the 5G network over the mmW band.

8. The computer-readable medium of claim 1 further comprising:
  receiving, at a packet gateway, an indication that the mmW band is inaccessible to the wireless device; and
  limiting the download of the at least one data item by the wireless device.

9. The computer-readable medium of claim 1 further comprising:
  cause the wireless device to throttle download of the at least one data item in response to a packet gateway receiving an indication of a condition affecting the communication link,
  wherein the condition is detected by the NAN, and
  wherein the condition relates to network capacity or network congestion.

10. The computer-readable medium of claim 1, wherein:
  a packet gateway receives a request from the NAN to allow or limit access by the wireless device to the 5G network based on a condition of the network detected by the NAN, and
  wherein the condition relates to the communications link.

11. The computer-readable medium of claim 1, further comprising:
  receiving a request issued by the wireless device to download the at least one data item over the 5G network,
  wherein the request is received by a packet gateway (PGW) of the 5G network; and
  wherein the wireless device is enabled by the PGW to download the at least one data item over the mmW band of the 5G network.

12. A packet gateway apparatus, comprising:
  at least one hardware processor coupled to a 5G network;
  at least one data storage component, coupled to the at least one processor and storing instructions, which when executed by the at least one processor, perform operations comprising:
    receive an indication of a request issued by a wireless device to download data over the 5G network,
      wherein the wireless device has access to the 5G network over a millimeter wave (mmW) band and a non-mmW band, and
      wherein the access to the 5G network over the mmW band substantially requires line-of-sight (LOS) to the wireless device from a network access node (NAN);
    receive one or more conditions that affect access by the wireless device to the 5G network,
      wherein the one or more conditions indicate that the wireless device is connected to the 5G network over the mmW band rather than the non-mmW band; and
    provide instructions to enable the wireless device to access the 5G network over the mmW band,
      wherein the instructions are based on one or more policies stored in the at least one data storage component.

13. The packet gateway apparatus of claim 12, wherein the one or more policies includes a policy to control data access by the wireless device and
  wherein the packet gateway apparatus receives, for billing in accordance with a service plan related to the wireless device, a record indicating access to the 5G network by the wireless device, and wherein the policy incentivizes mmW utilization by granting subscribers free mmW utilization and charging for non-mmW utilization.

14. The packet gateway apparatus of claim 12, wherein as the wireless device changes from mmW bands to non-mmW bands, the NAN provides access to the 5G network via a policy of the packet gateway apparatus, to thereby promote mmW band utilization.

15. The packet gateway apparatus of claim 12, wherein the packet gateway apparatus receives, from the NAN, data regarding requests from the wireless device and network conditions, whereby the NAN functions as a trusted source of network and connection status information for the packet gateway apparatus.

16. At least one non-transitory, computer-readable medium, storing instructions, which when executed by at least one data processor, perform operations for a wireless device accessing millimeter wave (mmW) nodes of a telecommunications network, the operations comprising:

permitting the wireless device to connect with a network access node (NAN), over either a mmW link or a non-mmW link, to thereby access the telecommunications network;

if the wireless device is substantially within line-of-sight (LOS) of the NAN and if network certain conditions exist for the mmW link, then establishing for the wireless device a high-speed, low-latency, high capacity access to the telecommunications network via the mmW link as opposed to the non-mmW link; and providing downloadable data to the wireless device over the mmW link, wherein a local memory of the wireless device is configured to store the downloadable data, whereby a user can later access the downloadable data to experience perceived access to the telecommunications network over the mmW link despite the absence of a current mmW link.

17. The computer-readable medium of claim 16, wherein while connected over the mmW link, the wireless device preloads to a local memory on the wireless device the downloadable data for the user to access later, thereby providing the user with an experience of perceived access to a 5G network over the mmW link despite the absence of the mmW link.

18. The computer-readable medium of claim 16, wherein the wireless device includes an application programming interface (API) that connects with local applications ("apps") running on the wireless device, and wherein the apps request an operating system on the wireless device to queue certain downloadable data items when the wireless device is connected to a mmW band of the 5G network.

19. The computer-readable medium of claim 16, wherein the wireless device autonomously predicts suitable data items to download based on the user's activities, and fills a local queue of the suitable data items scheduled for download when the wireless device connects to a mmW band of the 5G network.

20. The computer-readable medium of claim 16, wherein a network carrier for the telecommunications network: a) offers free mmW band access but charges user for non-mmW band utilization, or b) limits performance by wireless devices on non-mmW links to induce users into seeking mmW connections, or c) provides streaming video with a 4K-definition only over mmW links.

* * * * *